United States Patent
Nakamura et al.

(10) Patent No.: US 12,115,760 B2
(45) Date of Patent: Oct. 15, 2024

(54) RESIN LAYERED BODY

(71) Applicant: Mitsubishi Gas Chemical Company, Inc., Tokyo (JP)

(72) Inventors: Jin Nakamura, Kanagawa (JP); Takanori Miyabe, Kanagawa (JP); Takafumi Oda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 290 days.

(21) Appl. No.: 17/636,310

(22) PCT Filed: Aug. 6, 2020

(86) PCT No.: PCT/JP2020/030135
§ 371 (c)(1),
(2) Date: Feb. 17, 2022

(87) PCT Pub. No.: WO2021/033560
PCT Pub. Date: Feb. 25, 2021

(65) Prior Publication Data
US 2022/0288900 A1 Sep. 15, 2022

(30) Foreign Application Priority Data
Aug. 22, 2019 (JP) ................ 2019-152055

(51) Int. Cl.
*B32B 27/08* (2006.01)
*B32B 1/00* (2006.01)
(Continued)

(52) U.S. Cl.
CPC ............. *B32B 27/08* (2013.01); *B32B 1/00* (2013.01); *B32B 27/34* (2013.01); *B32B 27/36* (2013.01);
(Continued)

(58) Field of Classification Search
CPC .......... B32B 27/08; B32B 1/00; B32B 27/34; B32B 27/36; B32B 2307/7242;
(Continued)

(56) References Cited

U.S. PATENT DOCUMENTS 8,124,204 B2 * 2/2012 Mitadera ............. B65D 1/0215
428/36.6
2003/0039779 A1 2/2003 Share et al.

FOREIGN PATENT DOCUMENTS

JP 2003-285879 A 10/2003
JP 2005-088901 A 4/2005
(Continued)

OTHER PUBLICATIONS

International Search Report for PCT/JP2020/030135, mailed Oct. 13, 2020, and English Translation submitted herewith (7 pages).

*Primary Examiner* — James C Yager
(74) *Attorney, Agent, or Firm* — Fitch, Even, Tabin & Fla (57) ABSTRACT

Provided is a resin laminate having: a polyester layer containing a polyester resin (A); and a mixed resin layer containing a polyamide resin (B) and a polyester resin (C). The polyamide resin (B) includes a constituent unit derived from a diamine and a constituent unit derived from a dicarboxylic acid, with 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons. Further, a radical concentration in the mixed resin layer is $1\times10^{-12}$ mol/g or greater. Also provided are a multilayered film and a multilayered container formed from the resin laminate.

15 Claims, 1 Drawing Sheet

(51) Int. Cl.
  *B32B 27/34*  (2006.01)
  *B32B 27/36*  (2006.01)
  *B65D 1/02*   (2006.01)
  *B65D 65/40*  (2006.01)
(52) U.S. Cl.
  CPC ............ *B65D 1/0215* (2013.01); *B65D 65/40* (2013.01); *B32B 2307/7242* (2013.01); *B32B 2439/00* (2013.01); *B65D 2565/387* (2013.01)
(58) Field of Classification Search
  CPC ............ B32B 2439/00; B32B 2250/05; B32B 2250/244; B32B 2250/40; B32B 2250/42; B32B 2270/00; B32B 2307/414; B32B 2307/7244; B32B 2307/732; B32B 2307/748; B32B 2439/70; B32B 27/16; B65D 2565/387; B65D 1/0215; B65D 65/40; Y02W 30/80

See application file for complete search history.

(56) References Cited

FOREIGN PATENT DOCUMENTS

| | | |
|---|---|---|
| JP | 2007-223667 A | 9/2007 |
| JP | 2012-254594 A | 12/2012 |
| JP | 2015-101403 A | 6/2015 |
| JP | 2016-198912 A | 12/2016 |
| JP | 2017-122723 A | 7/2017 |
| WO | 2014/126110 A1 | 8/2014 |

\* cited by examiner

RESIN LAYERED BODY

CROSS-REFERENCE TO RELATED APPLICATIONS

This application is a U.S. national phase application filed under 35 U.S.C. § 371 of International Application Number PCT/JP2020/030135, filed Aug. 6, 2020, designating the United States, which claims priority from Japanese Application Number 2019-152055, filed Aug. 22, 2019.

FIELD OF THE INVENTION

The present invention relates to a resin laminate, a multilayered film, and a multilayered container.

BACKGROUND OF THE INVENTION

Polyester resins, exemplified by polyethylene terephthalate (PET), excel in characteristics such as transparency, mechanical properties, melt stability, and recyclability, and therefore are currently widely used in various packaging materials such as films, sheets, and hollow containers.

However, with films and hollow containers made from only a polyester resin, the gas barrier properties with respect to gases such as oxygen are not sufficient. Thus, multilayered bodies and multilayered containers having a polyamide resin layer are being examined. Furthermore, there are attempts to irradiate these multilayered bodies and multilayered containers with electron beams. For example, Patent Document 1 discloses, for the purpose of producing a laminate excelling in strength, gas permeation resistance, pin hole resistance, and flexibility, a method of producing a laminate by irradiating a polyamide resin film or a polyester resin film with electron beams, and then overlaying and adhering the film surface irradiated with electron beams. Furthermore, Patent Document 2 discloses a container made from a polyethylene terephthalate-based resin irradiated with radiation after being molded to improve oxygen scavenging and oxygen barrier properties.

CITATION LIST

Patent Documents

Patent Document 1: JP 2012-254594 A
Patent Document 2: JP 2003-285879 A

SUMMARY OF INVENTION

As described in Patent Document 1, irradiating a laminate or container having a polyamide resin layer and a polyester resin layer with electron beams can improve interlayer adhesiveness to some extent, but irradiation with electron beams results in another problem of discoloration, where the resin turned to yellow. Therefore, a demand has existed for a colorless multilayered film and multilayered container that excel in gas barrier properties and adhesiveness between resin layers and exhibit no yellowing.

Thus, an object of the present invention is to provide a resin laminate, a multilayered film, and a multilayered container having excellent gas barrier properties, excellent adhesiveness between layers, and excellent achromaticity.

As a result of diligent research in light of the problems described above, the present inventors discovered that the problems above can be solved by having a specific concentration of a radical in a resin laminate including a polyester layer and a mixed resin layer containing a specific polyamide resin and polyester resin, and with this discovery, the present inventors arrived at the present invention. The present invention provides the following aspects (1) to (15).

(1)

A resin laminate including: a polyester layer containing a polyester resin (A); and a mixed resin layer containing a polyamide resin (B) and a polyester resin (C); wherein the polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons; and a radical concentration in the mixed resin layer is $1\times10^{-12}$ mol/g or greater.

(2)

The resin laminate according to (1), wherein a mass ratio [(B)/(C)] of the polyamide resin (B) to the polyester resin (C) in the mixed resin layer is from 55/45 to 99/1.

(3)

The resin laminate according to (1) or (2), wherein the polyester resin (A) includes a constituent unit derived from a dicarboxylic acid and a constituent unit derived from a diol, 90 mol % or greater of the constituent unit derived from a dicarboxylic acid being a constituent unit derived from terephthalic acid, and 90 mol % or greater of the constituent unit derived from a diol being a constituent unit derived from ethylene glycol.

(4)

The resin laminate according to any one of (1) to (3), wherein the polyester resin (C) includes a constituent unit derived from a dicarboxylic acid and a constituent unit derived from a diol, 90 mol % or greater of the constituent unit derived from a dicarboxylic acid being a constituent unit derived from terephthalic acid, and 90 mol % or greater of the constituent unit derived from a diol being a constituent unit derived from ethylene glycol.

(5)

The resin laminate according to any one of (1) to (4), wherein the polyamide resin (B) includes a constituent unit derived from a diamine and a constituent unit derived from a dicarboxylic acid, 80 mol % or greater of the constituent unit derived from a diamine being a constituent unit derived from xylylenediamine, and 80 mol % or greater of the constituent unit derived from a dicarboxylic acid being a constituent unit derived from adipic acid.

(6)

The resin laminate according to any one of (1) to (5), wherein the resin laminate is a three-layer structure laminated in the order of polyester layer/mixed resin layer/polyester layer, or a five-layer structure laminated in the order of polyester layer/mixed resin layer/polyester layer/mixed resin layer/polyester layer.

(7)

The resin laminate according to any one of (1) to (6), irradiated with an electron beam.

(8)

The resin laminate according to any one of (1) to (7), wherein the radical concentration in the mixed resin layer is from $10\times10^{-12}$ to $2000000\times10^{-12}$ mol/g.

(9)

A multilayered film including the resin laminate described in any one of (1) to (8).

(10)
A multilayered container including the resin laminate described in any one of (1) to (8).
(11)
The multilayered container according to (10), having at least one polyester layer at an inner side relative to the mixed resin layer and another at least one polyester layer at an outer side relative to the mixed resin layer.
(12)
The multilayered container according to (10) or (11), wherein an overall thickness of the multilayered container is from 50 to 500 μm.
(13)
The multilayered container according to any one of (10) to (12), wherein when the overall thickness is defined as 100%, a location of the mixed resin layer starts at a position from 5 to 35% from an inner surface, and a thickness of the mixed resin layer is from 1 to 15%.
(14)
A method for producing a multilayered container satisfying (1) to (3) below, the method including the following steps 1 and 2:
 1: forming a multilayered container molded body having at least one polyester layer at an inner side relative to a mixed resin layer and another at least on polyester layer at an outer side relative to a mixed resin layer.
 2: irradiating the multilayered container molded body with an electron beam; wherein
 (1) The multilayered container includes a polyester layer containing a polyester resin (A), and a mixed resin layer containing a polyamide resin (B) and a polyester resin (C).
 (2) The polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons.
 (3) A radical concentration in the mixed resin layer is $1\times10^{-12}$ mol/g or greater.
(15)
The method for producing a multilayered container according to (14), wherein, in step 2, the multilayered container molded body is irradiated with an electron beam from the inside.

According to the present invention, a resin laminate, a multilayered film, and a multilayered container having excellent gas barrier properties, excellent adhesiveness between layers, and excellent achromaticity can be provided.

DESCRIPTION OF EMBODIMENTS

[Resin Laminate]
A resin laminate of the present invention includes: a polyester layer containing a polyester resin (A); and a mixed resin layer containing a polyamide resin (B) and a polyester resin (C); wherein the polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons; and a radical concentration in the mixed resin layer is $1\times10^{-12}$ mol/g or greater.

The present invention will be described in detail below.

Examples of a form of the resin laminate of the present invention include a hollow container shape, a box shape, a bag shape, a film shape, and a sheet shape. A hollow container shape, a box shape, and a bag shape are preferable. When the resin laminate is formed in the shape of a hollow container, a box, or a bag, the contents stored therein can be protected from external oxygen or the like. In particular, when the resin laminated is formed into a hollow container, recyclability after use is also excellent.

When the resin laminate is used in a film shape or a sheet shape, the contents can likewise be protected from external oxygen and the like by using the resin laminate in a lid portion, a stopper portion, or the like of a container.

The resin laminate of the present invention preferably has a structure of three to five layers, more preferably a structure of three layers or five layers, and even more preferably a three layer structure.

Specifically, the resin laminate is preferably a three-layer structure laminated in the order of polyester layer/mixed resin layer/polyester layer, or a five-layer structure laminated in the order of polyester layer/mixed resin layer/polyester layer/mixed resin layer/polyester layer.

<Polyester Layer>
The polyester layer configuring the resin laminate of the present invention contains a polyester resin (A).
(Polyester Resin (A))
Examples of the polyester resin (A) used in the present invention include a copolymer of a dicarboxylic acid and a diol, a polymer of lactone or hydroxycarboxylic acid, or a copolymer of a mixture of these monomers, and the polyester resin (A) is preferably a copolymer of a dicarboxylic acid and a diol.

A preferred polyester resin (A) has a constituent unit derived from a dicarboxylic acid (hereinafter, also referred to as "dicarboxylic acid unit") and a constituent unit derived from a diol (hereinafter, also referred to as a "diol unit").

The dicarboxylic acid unit of the polyester resin (A) preferably contains 90 mol % or greater, more preferably 95 mol % or greater, and even more preferably 99 mol % or greater of a constituent unit derived from terephthalic acid. If the amount of the constituent units derived from terephthalic acid in the dicarboxylic acid unit is 90 mol % or higher, the polyester resin is less likely to become amorphous. Therefore, when a film or container is produced using the polyester resin, heat shrinkage does not easily occur, and heat resistance becomes favorable.

In addition, the diol unit of the polyester resin (A) preferably contains 90 mol % or greater, more preferably 95 mol % or greater, and even more preferably 99 mol % or greater of a constituent unit derived from ethylene glycol.

That is, as a combination of the dicarboxylic acid unit and the diol unit of the polyester resin (A), the polyester resin (A) preferably includes a constituent unit derived from a dicarboxylic acid and a constituent unit derived from a diol with 90 mol % or greater of the constituent unit derived from a dicarboxylic acid being a constituent unit derived from terephthalic acid, and 90 mol % or greater of the constituent unit derived from a diol being a constituent unit derived from ethylene glycol, and more preferably, the main component is polyethylene terephthalate.

The polyester resin (A) may contain a constituent unit derived from a bifunctional compound such as a dicarboxylic acid besides terephthalic acid and a diol besides ethylene glycol.

Examples of dicarboxylic acids besides terephthalic acid include sulfophthalic acid, metal sulfophthalates, and aromatic dicarboxylic acids other than terephthalic acid.

The aromatic dicarboxylic acid other than terephthalic acid is preferably isophthalic acid, orthophthalic acid, naphthalene dicarboxylic acid, and 4,4'-biphenyldicarboxylic acid.

Examples of diols besides ethylene glycol include neopentyl glycol and cyclohexanedimethanol.

The polyester resin (A) may also contain a constituent unit derived from a monofunctional compound such as a monocarboxylic acid and a mono-alcohol, and may contain a constituent unit derived from a polyfunctional compound having at least three groups selected from carboxy groups, hydroxy groups, and ester-forming groups thereof.

The polyester resin (A) can be produced through a known method such as direct esterification and trans-esterification. Examples of polycondensation catalysts that can be used when producing the polyester resin (A) include known antimony compounds, germanium compounds, and aluminum compounds.

The polyester resin (A) may also contain a recycled polyester or may be a mixture of two or more resins.

An intrinsic viscosity of the polyester resin (A) is not particularly limited, but is preferably from 0.5 to 2.0 dL/g and more preferably from 0.6 to 1.5 dL/g. A molecular weight of the polyester resin is sufficiently high when the intrinsic viscosity is greater than or equal to 0.5 dL/g, and therefore the formed film or container can exhibit necessary mechanical properties.

Note that the intrinsic viscosity is measured as follows: dissolving the polyester resin to be measured in a mixed solvent of phenol/1,1,2,2-tetrachloroethane (=6/4 mass ratio) to prepare 0.2, 0.4, and 0.6 g/dL solutions, and then measuring the intrinsic viscosity at 25° C. using an automatic viscosity measuring apparatus (Viscotek, available from Malvern Instruments Limited).

In the resin laminate according to an embodiment of the present invention, the polyester layer may contain a resin besides the polyester resin (A) in a range that does not impair the effects of the present invention, but the content of the polyester resin (A) in the polyester layer is preferably 90 mass % or greater, more preferably 95 mass % or greater, and even more preferably 99 mass % or greater. Furthermore, the upper limit may be 100 mass %.

<Mixed Resin Layer>

The mixed resin layer configuring the resin laminate of the present invention contains a polyamide resin (B) and a polyester resin (C), and therefore excels in adhesiveness between layers and in achromaticity.

Although the reason for this is not clear, it is hypothesized that irradiation with electron beams creates radical species derived from the polyamide resin and the polyester resin in the mixed resin, thereby forming covalent bonds between the layers, and thus good adhesiveness between the layers is achieved. Furthermore, irradiation with electron beams creates a larger amount of radicals in the polyamide resin and easily colors the resin compared to the polyester resin. However, it is hypothesized that, when the polyester resin is mixed into the polyamide resin, the amount of radicals created in the mixed resin is moderately suppressed and achromaticity is improved. Therefore, it is thought that achromaticity can be made favorable even in a laminate having a high radical concentration when irradiated with electron beams as in an embodiment of the present invention, and the resin laminate according to an embodiment of the present invention satisfactorily has both of these performance properties.

A mass ratio [(B)/(C)] of the polyamide resin (B) to the polyester resin (C) in the mixed resin layer is preferably from 55/45 to 99/1, more preferably from 60/40 to 99/1, even more preferably from 70/30 to 95/5, and yet even more preferably from 75/25 to 95/5. When the mass ratio of the polyamide resin to the polyester resin is within the range above, adhesiveness between layers and achromaticity are favorable. Furthermore, when the resin laminate according to an embodiment of the present invention is used as a multilayered container, the polyester resin layer and the mixed resin layer can be separated apart when recycling, and thus the resin laminate also excels in recyclability.

(Radical Concentration)

A radical concentration of the mixed resin layer in the resin laminate according to an embodiment of the present invention is $1 \times 10^{-12}$ mol/g or greater. From the viewpoints of achromaticity and adhesiveness between layers, the radical concentration of the mixed resin layer is $1 \times 10^{12}$ mol/g or greater, preferably from $10 \times 10^{-12}$ to $2000000 \times 10^{12}$ mol/g, more preferably from $10 \times 10^{-12}$ to $1000000 \times 10^{-12}$ mol/g, even more preferably from $100 \times 10^{-12}$ to $100000 \times 10^{-12}$ mol/g, yet even more preferably from $100 \times 10^{-12}$ to $90000 \times 10^{-12}$ mol/g, still even more preferably from $100 \times 10^{-12}$ to $10000 \times 10^{-12}$ mol/g, and still further preferably from $100 \times 10^{-12}$ to $5000 \times 10^{-12}$ mol/g.

When the radical concentration is within the range described above, adhesiveness between layers can be enhanced while achromaticity is maintained.

In order to achieve the radical concentration above, the resin laminate according to an embodiment of the present invention is preferably subjected to electron beam irradiation.

A proportion of the mixed resin layer in the resin laminate according to an embodiment of the present invention is, as a total, preferably 1 mass % or greater, more preferably 2 mass % or greater, and even more preferably 3 mass % or greater, and preferably 20 mass % or less, more preferably 15 mass % or less, and even more preferably 10 mass % or less, relative to the total mass of the resin laminate. When the proportion of the mixed resin layer is within the range described above, a resin laminate having excellent barrier properties and also superior interlayer adhesiveness can be formed.

A content of the polyamide resin (B) relative to a total amount of the polyester layer and the mixed resin layer is preferably from 0.5 to 12 mass %, more preferably from 1 to 10 mass %, even more preferably from 1.5 to 8 mass %, and yet even more preferably from 2 to 7 mass %.

(Polyamide Resin (B))

The polyamide resin (B) includes a constituent unit derived from a diamine (hereinafter, also referred to as a diamine unit) and a constituent unit derived from a dicarboxylic acid (hereinafter, also referred to as a dicarboxylic acid unit) with 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons.

Xylylenediamine is preferable as a diamine having an aromatic ring structure, the diamine being a compound constituting the constituent unit derived from a diamine (hereinafter, also referred to as a diamine unit) of the polyamide resin (B).

The polyamide resin (B) includes constituent units derived from xylylenediamine at 70 mol % or greater, preferably 80 mol % or greater, more preferably 90 mol % or greater, and even more preferably 95 mol % or greater of the constituent units derived from a diamine. When the constituent units derived from xylylenediamine constitutes 70 mol % or greater of the diamine units, the resin laminate according to an embodiment of the present invention has enhanced achromaticity and adhesiveness while maintaining a good gas barrier property.

The xylylenediamine may be any of an ortho-, meta-, or para-xylylenediamine, but from the viewpoint of availability, meta-xylylenediamine is preferable.

Examples of the compound that constitutes the diamine unit of the polyamide resin (B) include, as diamines other than diamines having an aromatic ring structure, aliphatic diamines and diamines having an alicyclic structure, but aliphatic diamines are preferable from the viewpoints of availability and improved achromaticity and adhesiveness.

Specific examples of the aliphatic diamine include tetramethylene diamine, hexamethylene diamine, nonamethylene diamine, 2-methyl-1,5-pentane diamine, undecamethylene diamine, dodecamethylene diamine, 2,2,4-trimethylhexamethylene diamine, 2,4,4-trimethylhexamethylene diamine, and 5-methylnonamethylene diamine.

Examples of diamines having an alicyclic structure include 1,3-bis(aminomethyl)cyclohexane, 1,4-bis(aminomethyl)cyclohexane, 1-amino-3-aminomethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine.

Furthermore, a trivalent or higher polyvalent amine such as bis(hexamethylene) triamine or a monomamine such as butylamine, hexylamine, and octylamine may be used within a range that does not impair the effects of the present invention.

In the polyamide resin (B), 70 mol % or greater, preferably 80 mol % or greater, more preferably 90 mol % or greater, and even more preferably 95 mol % or greater of the dicarboxylic acid units are constituent units derived from $\alpha,\omega$-linear aliphatic dicarboxylic acids having from 4 to 20 carbons. When 70 mol % or greater of the dicarboxylic acid units are constituent units derived from $\alpha,\omega$-linear aliphatic dicarboxylic acids having from 4 to 20 carbons, the achromaticity and adhesiveness of the obtained resin laminate can be efficiently increased.

Examples of the $\alpha,\omega$-linear aliphatic dicarboxylic acid having from 4 to 20 carbons include succinic acid, glutaric acid, adipic acid, pimelic acid, suberic acid, azelaic acid, sebacic acid, 1-10-decanedicarboxylic acid, 1,11-undecanedicarboxylic acid, and 1,12-dodecanedicarboxylic acid. Among these, adipic acid and sebacic acid are preferable, and adipic acid is more preferable. Furthermore, one type of these $\alpha,\omega$-linear aliphatic dicarboxylic acids may be used alone, or a combination of two or more types may be used.

In addition to the $\alpha,\omega$-linear aliphatic dicarboxylic acid having from 4 to 20 carbons, other examples of the compound that can constitute the dicarboxylic acid unit of the polyamide resin (B) include, but are not limited to, dicarboxylic acids having an alicyclic structure, such as 1,3-cyclohexane dicarboxylic acid, 1,4-cyclohexane dicarboxylic acid, decalin dicarboxylic acid, norbornane dicarboxylic acid, tricyclodecane dicarboxylic acid, pentacyclododecane dicarboxylic acid, isophorone dicarboxylic acid, and 3,9-bis(2-carboxyethyl)-2,4,8,10-tetraoxaspiro[5.5]undecane; dicarboxylic acids having an aromatic ring such as terephthalic acid, isophthalic acid, phthalic acid, orthophthalic acid, 2-methylterephthalic acid, naphthalene dicarboxylic acid, biphenyl dicarboxylic acid, and tetralin dicarboxylic acid; and short chain alkyl esters thereof. Specific examples of the short-chain alkyl esters include those having from 1 to 3 carbons, such as methyl ester, ethyl ester, propyl ester, and isopropyl ester, and of these, methyl esters are preferable.

Furthermore, a trivalent or higher polyvalent carboxylic acid such as trimellitic acid, trimesic acid, pyromellitic acid, and tricarballylic acid may be used, or a monocarboxylic acid may be used, within a range that does not impair the effects of the present invention.

Note that, as a unit constituting the polyamide resin (B), in addition to the diamine unit and dicarboxylic acid unit above, a constituent unit derived from an aliphatic aminocarboxylic acid and a constituent unit derived from an aromatic aminocarboxylic acid or the like can also be used as copolymerization units in a range that does not impair the effects of the present invention.

Furthermore, the combination of the diamine unit and the dicarboxylic acid unit of the polyamide resin (B) is such that the polyamide resin (B) includes the constituent unit derived from a diamine and the constituent unit derived from a dicarboxylic acid with 70 mol % or greater of the constituent derived from a diamine being a constituent unit derived from xylylenediamine, and 70 mol % or greater of the constituent unit derived from a dicarboxylic acid being a constituent unit derived from an $\alpha,\omega$-linear aliphatic dicarboxylic acid having from 4 to 20 carbons. However, the polyamide resin (B) preferably includes the constituent unit derived from a diamine and the constituent unit derived from a dicarboxylic acid with 80 mol % or greater of the constituent derived from a diamine being a constituent unit derived from xylylenediamine, and 80 mol % or greater of the constituent unit derived from a dicarboxylic acid being a constituent unit derived from adipic acid.

Specific examples of the polyamide resin (B) according to an embodiment of the present invention include polyamide MXD6 (polyxylylene adipamide), polyamide MXD10 (polyxylylene sebacamide), and polyamide MXD6I (isophthalic acid co-polymerized poly-meta-xylylene adipamide), and from the viewpoints of availability, gas barrier properties, and achromaticity, polyamide MXD6 or polyamide MXD10 is preferable, and polyamide MXD6 is more preferable. Furthermore, one type of these polyamide resins may be used alone, or two or more types may be used in combination.

(Method of Producing the Polyamide Resin (B))

The polyamide resin (B) is preferably produced by a melt polycondensation method.

As the melt polycondensation method, a method in which the diamine is added directly to molten dicarboxylic acid, and the contents are polycondensed is preferable. In this case, in order to maintain the reaction system in a uniform liquid state, preferably, the diamine is continuously added to the dicarboxylic acid, and during that time, polycondensation is allowed to proceed while the temperature of the reaction system is raised such that the reaction temperature does not fall below the melting points of the produced oligoamide and polyamide.

A phosphorus atom-containing compound may be added in the polycondensation system of the polyamide resin (B)

to produce an effect of an amidation reaction promotion and discoloration prevention during polycondensation.

As the phosphorus atom-containing compound, from the viewpoints of excelling in an effect of the amidation reaction promotion and the discoloration prevention, metal salts of hypophosphorous acid, such as sodium hypophosphite, potassium hypophosphite, lithium hypophosphite, and calcium hypophosphite are preferable, and sodium hypophosphite is more preferable.

An amount of the phosphorus atom-containing compound added to the polycondensation system of the polyamide resin (B) is, in terms of the phosphorus atom concentration in the polyamide resin (B), preferably from 1 to 500 ppm, more preferably from 3 to 450 ppm, and even more preferably from 5 to 400 ppm. When the amount of the phosphorus atom-containing compound is within the range described above, discoloration of the polyamide during polycondensation can be prevented, and gelling of the polyamide can be suppressed, and therefore the appearance of the produced film or container can be favorably maintained.

Furthermore, an alkali metal compound and/or an alkaline earth metal compound may be added to the polycondensation system of the polyamide resin (B) in combination with the phosphorus atom-containing compound.

The polyamide resin (B) produced by melt polycondensation is preferably pelletized, and then dried and used, and is more preferably solid phase polymerized to further increase the degree of polymerization.

(Characteristics, Etc. Of the Polyamide Resin (B))

A relative viscosity of the polyamide resin (B) is preferably from 1.5 to 4.2, more preferably from 1.6 to 4.0, even more preferably from 1.7 to 3.8, and yet even more preferably from 1.9 to 3.0.

When the relative viscosity of the polyamide resin (B) is within the range described above, a film or container having stable molding processability and an excellent appearance can be produced.

Note that in the present invention, the relative viscosity of the polyamide resin (B) is measured by the following method. Specifically, 0.2 g of the polyamide resin is precisely weighed and dissolved in 20 mL of 96 mass % sulfuric acid at 20 to 30° C. while stirring. Soon after the polyamide resin is fully dissolved, 5 mL of the solution is sampled to a Cannon-Fenske viscometer and allowed to stand for 10 minutes in a 25° C. thermostat bath, and then the drop time (t) of the solution is measured. The drop time ($t_0$) of the 96 mass % sulfuric acid is measured in the same manner. The relative viscosity of the polyamide resin is then calculated using the measured values of t and $t_0$ according to the following equation.

$$\text{Relative Viscosity} = t/t_0$$

A content of the polyamide resin (B) in the mixed resin layer is preferably not less than 55 mass %, more preferably not less than 60 mass %, even more preferably not less than 70 mass %, even more preferably not less than 75 mass %, and still even more preferably not less than 80 mass %. Furthermore, the content thereof is preferably not greater than 99 mass %, more preferably not greater than 95 mass %, and even more preferably not greater than 90 mass %, based on the mixed resin layer.

In a case where the content of the polyamide resin (B) is not less than 55 mass %, oxygen permeability can be sufficiently suppressed, and when the content is not greater than 99 mass %, the achromaticity of the obtained resin laminate is favorable.

(Polyester Resin (C))

The polyester resin (C) in the mixed resin is a copolymer of a dicarboxylic acid and a diol, a polymer of a lactone or a hydroxycarboxylic acid, or a copolymer of a mixture of these monomers. A copolymer of a dicarboxylic acid and a diol is preferable, but a polyester resin that is the same as that of the polyester resin (A) may be used, and the preferable range is the same as that of the polyester resin (A).

An aspect in which the polyester resin (C) is a copolymer of a dicarboxylic acid and a diol is described below.

The dicarboxylic acid unit preferably contains 80 mol % or greater, more preferably 90 mol % or greater, and even more preferably 95 mol % or greater of constituent units derived from terephthalic acid. If the amount of the constituent units derived from terephthalic acid in the dicarboxylic acid unit is 80 mol % or higher, the polyester resin is less likely to become amorphous, and therefore when a film or container is produced using the polyester resin, heat shrinkage does not easily occur, and heat resistance becomes favorable.

Furthermore, the diol unit preferably contains 80 mol % or greater, more preferably 90 mol % or greater, and even more preferably 95 mol % or greater of constituent units derived from ethylene glycol.

That is, as the combination of a dicarboxylic acid unit and a diol unit of a polyester resin (C), the polyester resin (C) preferably has a constituent unit derived from a dicarboxylic acid for which 80 mol % or higher is a constituent unit derived from terephthalic acid, and a constituent unit derived from a diol for which 80 mol % or higher is a constituent unit derived from ethylene glycol; the polyester resin (C) more preferably has a constituent unit derived from a dicarboxylic acid for which 90 mol % or higher is a constituent unit derived from terephthalic acid, and a constituent unit derived from a diol for which 90 mol % or higher is a constituent unit derived from ethylene glycol; and the main component of the polyester resin (C)) is more preferably made from polyethylene terephthalate.

The polyester resin (C) may contain a constituent unit derived from a bifunctional compound such as a dicarboxylic acid besides terephthalic acid and a diol besides ethylene glycol.

Examples of dicarboxylic acids besides terephthalic acid include sulfophthalic acid, metal sulfophthalates, and aromatic dicarboxylic acids besides terephthalic acid.

Isophthalic acid, orthophthalic acid, naphthalene dicarboxylic acid, and 4,4'-biphenyldicarboxylic acid are preferable as the aromatic dicarboxylic acid other than terephthalic acid.

Examples of diols besides ethylene glycol include neopentyl glycol and cyclohexanedimethanol.

Furthermore, the polyester resin (C) may also contain a constituent unit derived from a monofunctional compound such as a monocarboxylic acid and a mono-alcohol, and may contain a constituent unit derived from a polyfunctional compound having at least three groups selected from carboxy groups, hydroxy groups, or ester-forming groups thereof.

The polyester resin (C) can be produced through a known method such as direct esterification and trans-esterification. Examples of polycondensation catalysts that can be used when producing the polyester resin (C) include known antimony compounds, germanium compounds, and aluminum compounds.

The polyester resin (C) may also contain a recycled polyester resin and a recycled polyester, or may be a mixture of two or more resins.

An intrinsic viscosity of the polyester resin (C) is not particularly limited, but is preferably from 0.5 to 2.0 dL/g and more preferably from 0.6 to 1.5 dL/g. A molecular weight of the polyester resin is sufficiently high when the intrinsic viscosity is greater than or equal to 0.5 dL/g, and therefore the obtained film or container can exhibit necessary mechanical properties.

A content of the polyester resin (C) in the mixed resin is preferably 1 mass % or greater, more preferably 5 mass % or greater, even more preferably 10 mass % or greater, and yet even more preferably 15 mass % or greater, and is preferably 40 mass % or less, more preferably 30 mass % or less, even more preferably 25 mass % or less, and yet even more preferably 20 mass % or less, based on the mixed resin layer. When the content of the polyester resin (C) is 1 mass % or greater, the interlayer adhesiveness can be enhanced, and achromaticity can be further improved.

<Other Components>

Examples of the other components contained in the polyester layer and mixed resin layer constituting the resin laminate according to an embodiment of the present invention include recycling aids and transition metals.

A recycling aid is a compound that has an effect of suppressing yellowing in the recycling process in production of a recycled polyester, and an aldehyde scavenger is preferable as the recycling aid.

The recycling aid is preferably a compound that contains an amino group and has the ability to suppress yellowing of the polyester resin, and specifically, is more preferably at least one compound selected from the group consisting of anthranilamide, anthranilic acid, and nylon 6I/6T.

The polyester layer and the mixed resin layer may include a transition metal for the purpose of inducing an oxidation reaction of the resin to increase the oxygen absorption function and to further enhance gas barrier properties.

From the viewpoint of expressing an oxygen absorption capacity, the transition metal is preferably at least one selected from the group consisting of cobalt, iron, manganese, and nickel.

In an embodiment the present invention, from the viewpoint of favorable expression of an oxygen absorption capacity, it is preferable to use at least one selected from the group consisting of carboxylates, carbonates, acetylacetonate complexes, oxides, and halides, each containing a transition metal.

One type of the abovementioned transition metals may be used alone, or two or more types may be used in combination.

In addition to the components described above, the polyester layer and the mixed resin layer may include additives such as coloring agents, heat stabilizers, light stabilizers, moisture repellents, desiccants, lubricants, spreading agents, and the like.

[Multilayered Film]

The multilayered film according to an embodiment of the present invention includes the resin laminate described above.

That is, the multilayered film according to an embodiment of the present invention includes: a polyester layer containing a polyester resin (A); and a mixed resin layer containing a polyamide resin (B) and a polyester resin (C); wherein the polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an $\alpha,\omega$-linear aliphatic dicarboxylic acid having from 4 to 20 carbons; and a radical concentration of the mixed resin layer is $1\times10^{12}$ mol/g or greater.

The configuration of the multilayered film according to an embodiment of the present invention, the resins that are used, and the like are the same as the configurations and resins, etc. described in the [Resin laminate] section above.

A thickness of the multilayered film according to an embodiment of the present invention is preferably from 50 to 500 µm, more preferably from 70 to 350 µm, and even more preferably from 100 to 250 µm.

Examples of applications of the multilayered film include packaging films and the like.

When the multilayered film according to an embodiment of the present invention is used in a packaging film, the contents can be protected from external oxygen and the like, and the packaging film excels in visibility of the contents because of the excellent achromaticity.

The multilayered film according to an embodiment of the present invention can be produced by a multilayering step of forming a laminated film, and an electron beam irradiation step.

Examples of methods for forming the laminated film in the multilayering step include a coextrusion method, a lamination method, and a heat sealing method, and a coextrusion method is preferable.

When a film having a three-layer structure laminated in the order of a polyester layer/mixed resin layer/polyester layer is formed in the multilayering step, in the subsequent electron beam irradiation step, the film is preferably irradiated with an electron beam from the side of the polyester layer with the smaller thickness between the outer polyester layers.

[Multilayered Container]

The multilayered container according to an embodiment of the present invention is made from the resin laminate described above.

That is, the multilayered container according to an embodiment of the present invention includes: a polyester layer containing a polyester resin (A); and a mixed resin layer containing a polyamide resin (B) and a polyester resin (C); wherein the polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an $\alpha,\omega$-linear aliphatic dicarboxylic acid having from 4 to 20 carbons; and a radical concentration in the mixed resin layer is $1\times10^{-12}$ mol/g or greater.

The configuration of the multilayered container according to an embodiment of the present invention, the resins that are used, and the like are the same as the configurations and resins, etc. described in the [Resin laminate] section above.

<Configuration and Characteristics of the Multilayered Container>

The multilayered container according to an embodiment of the present invention is preferably a hollow container, and when the multilayered container is a hollow container, at least the trunk section of the hollow container has a multilayered laminated structure.

The multilayered container according to an embodiment of the present invention includes the polyester layer containing the polyester resin (A). The multilayered container preferably has at least one polyester layer at an inner side relative to the mixed resin layer and another at least one polyester layer at an outer side relative to the mixed resin layer, and each polyester layer is more preferably disposed in direct contact with the mixed resin layer.

The multilayered container according to an embodiment of the present invention preferably has a structure of three to five layers, more preferably a structure of three layers or five layers, and even more preferably a three layer structure.

Specifically, the resin laminate is preferably a three-layer structure laminated in the order of the polyester layer/mixed resin layer/polyester layer, or a five-layer structure laminated in the order of the polyester layer/mixed resin layer/polyester layer/mixed resin layer/polyester layer.

The multilayered container according to an embodiment of the present invention may have another layer besides the polyester layer and the mixed resin layer. An example of the other layer is an adhesive layer containing an adhesive resin interposed between the polyester layer and the mixed resin layer. However, from the viewpoint of improvement of molding processability and separation ease during recycling, an adhesive layer is preferably not included.

When the overall thickness of the multilayered container according to an embodiment of the present invention is defined as 100%, a location of the mixed resin layer preferably starts at a position of not greater than 35%, more preferably not greater than 30%, and even more preferably not greater than 27% from the inner surface. In addition, the location of the mixed resin layer preferably starts at a position of 5% or greater, more preferably 5.5% or greater, even more preferably 6% or greater, and yet even more preferably 6.5% or greater from the inner surface.

Satisfying the requirements above in the trunk section of the multilayered container is more preferable, and satisfying the requirements above in the central part of the trunk section (the central part of the multilayered container in the height direction) is even more preferable.

Note that when the multilayered container has a plurality of mixed resin layers, the innermost mixed resin layer preferably satisfies the above requirements.

When the position of the mixed resin layer is set to within the range described above, a multilayered container excelling in delamination resistance can be produced. Furthermore, when the mixed resin layer is positioned within the range described above, in a case in which electron beam irradiation is implemented from the interior of the multilayered container as described below, the electron beam reaches the mixed resin layer and creates radicals. And thus adhesiveness at the interface between the polyester layer and the mixed resin layer is improved, and delamination resistance is further enhanced.

From the viewpoints described above, when the overall thickness of the multilayered container is defined as 100%, a thickness of the mixed resin layer is preferably 1% or greater, more preferably 1.5% or greater, and even more preferably 2% or greater, and is also preferably 15% or less, more preferably 12.5% or less, and even more preferably 11% or less.

Here, the thickness of the mixed resin layer described above is measured by a method described in the examples.

That is, when the overall thickness of the multilayered container is defined as 100%, a combination of the position and thickness of the mixed resin layer is preferably such that a location of the mixed resin layer starts at a position from 5 to 35% from the inner surface, and a thickness of the mixed resin layer is preferably from 1 to 15%.

Note that the mixed resin layer need not be laminated to a bottom section or a neck section of the multilayered container, and the mixed resin layer is preferably present at the thickness and position described above at least at a portion of the trunk section, preferably at the center part of the trunk section, and more preferably at 50% or greater of the length of the trunk section.

When the multilayered container is a hollow container, the overall thickness of the multilayered container is preferably from 50 to 500 µm, more preferably from 100 to 450 µm, and even more preferably from 200 to 400 µm. When the multilayered container is a hollow container, the overall thickness of the multilayered container is the overall thickness of the trunk section of the hollow container.

A volume of the multilayered container is not particularly limited, but from the viewpoints of the oxygen barrier property, delamination resistance, and manufacturing, the volume of the multilayered container is preferably from 30 mL to 3000 mL, more preferably from 50 mL to 2000 mL, even more preferably from 100 mL to 1500 mL, yet even more preferably from 200 mL to 1000 mL, and still even more preferably from 250 mL to 600 mL.

The position of the mixed resin layer is preferably from an upper part of a support ring of a preform described below to the vicinity of an injection gate, but from the viewpoint of adhesiveness improvement, the position of the mixed resin layer is preferably from a lower part of the support ring to a position of approximately 20 to 40 mm from the center of the injection gate of the preform.

From the viewpoint of adhesiveness, if the masses of multilayered containers are the same, a multilayered container having a volume of from 280 to 350 mL is more preferable than a multilayered container having a volume of 500 mL.

The multilayered container according to an embodiment of the present invention is preferably a hollow container, more preferably a liquid packaging container used by filling the inside of the hollow container with a liquid, and is even more preferably a beverage packaging container. Examples of the liquid to be filled in the inside may include various products, including beverages, such as water, carbonated water, oxygen water, hydrogen water, milk, dairy products, juices, coffee, coffee beverages, carbonated soft drinks, teas, and alcoholic beverages; liquid seasonings, such as sauces, soy sauce, syrup, sweet rice wines for cooking, and dressings; chemicals, such as agrochemicals and insecticides; pharmaceutical products; and detergents. Particularly preferable examples of the liquid are beverages or carbonated beverages which easily deteriorate in the presence of oxygen, including for example, beer, wine, coffee, coffee beverages, fruit juices, carbonated soft drinks, carbonated water, and teas.

In order to achieve the aforementioned radical concentration, the multilayered container according to an embodiment of the present invention is preferably subjected to electron beam irradiation, and is more preferably subjected to electron beam irradiation from the inside of the container. Note that the multilayered container of the present invention may be produced by subjecting a preform below to electron beam irradiation from the inside of the preform, and subsequently performing blow molding, or may be produced by subjecting a blow-molded multilayered container molded body to electron beam irradiation from the inside. Among these, the multilayered container is preferably obtained by subjecting a blow-molded multilayered container molded body to electron beam irradiation from the inside.

Furthermore, the multilayered container according to an embodiment of the present invention exhibits an excellent oxygen barrier property, and the oxygen permeability (mL/bottle·day·0.21 atm) of the container is preferably not greater than 0.040, more preferably not greater than 0.035, and even more preferably not greater than 0.030. Note that the oxygen permeability described above is based on the containers produced in the examples described below. Specifically, the oxygen permeability is that of a case in which a 500 mL (surface area: 0.04 m², average thickness of trunk section: 0.35 mm) container is formed using 25 g of resin.

The oxygen permeability of the container can be evaluated through an oxygen permeability test using the MOCON method in accordance with ASTM D3985. For the measurements, an OX-TRAN2/61, available from MOCON, Inc. is used. The produced 500 mL bottle is filled with 100 mL of water, nitrogen at 1 atm is circulated inside the bottle at a rate of 20 mL/min under conditions of an oxygen partial pressure of 0.21 atm, a temperature of 23° C., a bottle internal humidity of 100% RH, and an external humidity of 50% RH, and oxygen present in the nitrogen after circulating inside the bottle is detected by a coulometric sensor, and thus the oxygen permeability is measured.

[Method for Producing Multilayered Container]

A method for producing the multilayered container according to an embodiment of the present invention is selected appropriately with consideration of the structure and the like of the molded article. Specifically, the multilayered container can be produced by injecting a molten resin or resin composition into a mold from an injection molding machine to produce a preform, and then subjecting the preform to blow stretching (injection blow molding, injection stretch blow molding).

Alternatively, the multilayered container can be produced by blowing, in a mold, a parison produced by extruding a molten resin or resin composition into the mold from an extruder (direct blow molding).

The multilayered container according to an embodiment of the present invention is preferably fabricated by injection blow molding.

The multilayered container according to an embodiment of the present invention is preferably produced by subjecting a preform to biaxial stretch blow molding.

The multilayered container according to an embodiment of the present invention may be cold parison molded or hot parison molded. Cold parison molding (two-stage molding) is a molding process in which an injection molded preform is cooled to room temperature and stored, and then reheated with another device and supplied to blow molding. Meanwhile, hot parison molding (one stage molding) is a method of blow molding a parison by preheating at the time of injection molding and adjusting the temperature prior to blowing without completely cooling the parison to room temperature. In hot parison molding, in many cases, an injection molding machine, a temperature control zone, and a blow molding machine are provided in a single molding machine unit, and preform injection molding and blow molding are performed.

A first embodiment of the method for producing a multilayered container according to an embodiment of the present invention is an aspect of molding through cold parison molding.

Figure 1:
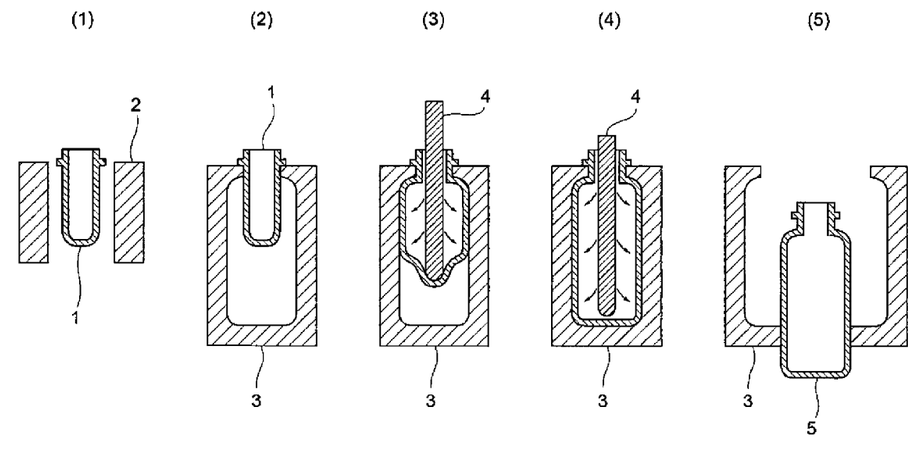
FIG. 1 is a conceptual schematic view illustrating individual steps of cold parison molding.

The first embodiment of the production method is described below in accordance with FIG. 1. FIG. 1 is a conceptual schematic view illustrating each step of cold parison molding. Of course, the first embodiment is not limited to the configuration depicted in FIG. 1.

In FIG. 1, first, a preform 1 is heated ((1) of FIG. 1). Heating is performed using an infrared heater 2 or the like.

Next, the heated preform 1 is biaxially stretched and blow molded. Namely, the preform is placed in a mold 3 ((2) of FIG. 1) and blow molded while being stretched by a stretching rod 4 ((3) and (4) of FIG. 1).

Stretching is, for example, a method in which the surface of a preform is heated, after which the preform is stretched axially by a mechanical means such as pressing with a core rod insert, and next, the stretched preform is stretched and blow molded in a transverse direction by blowing with high pressure air of normally from 2 to 4 MPa.

Furthermore, in order to improve the heat resistance of the container, stretching may be combined with a blow molding method that increases the crystallinity or reduces residual strain. For example, a method exists in which the surface of a multilayer preform is heated, after which the preform is blow molded inside a mold of a temperature equal to or higher than the glass transition point (single blow molding).

Furthermore, the blow molding method may also be a so-called double blow molding method that includes a primary blow molding step in which the preform is biaxially stretched and blow molded to a size larger than the final shape, a step in which the primary blow molded article is heated and thermally shrunk to mold a secondary intermediate molded article, and lastly, a secondary blow molding step in which this secondary intermediate molded article is blow molded into a final container shape.

After blow molding, the mold 3 is removed to obtain a multilayered container 5 ((5) in FIG. 1).

In cold parison molding, the parison temperature before blow molding is determined with consideration of the glass transition temperatures (Tg) of the resins constituting the multilayered container according to an embodiment of the present invention. The term "before blow molding" refers to, for example, immediately prior to being blown after passing through a preheating zone.

The parison temperature is preferably a temperature greater than the glass transition temperature ($Tg_{max}$) of the resin having the highest glass transition temperature among the resins constituting the multilayered container according to an embodiment of the present invention, and a temperature range of ($Tg_{max}$+0.1)° C. to ($Tg_{max}$+50)° C. is more preferable.

Furthermore, a difference between the glass transition temperature ($Tg_{min}$) of the resin having the lowest glass transition temperature among the resins constituting the multilayered container according to an embodiment of the present invention, and the $Tg_{max}$ described above is preferably not greater than 40° C., and more preferably not greater than 30° C. When the difference is in such a range, blow moldability tends to further improve.

Furthermore, when at least one of the resins constituting the multilayered container according to an embodiment of the present invention is a crystalline resin, the difference between a lowest temperature ($Tc_{min}$) among the crystallization temperatures (Tc) of the crystalline resins, and the glass transition temperature ($Tg_{max}$) of the resin with the highest glass transition temperature from among the resins constituting the multilayered container according to an embodiment of the present invention is preferably large.

Specifically, $Tc_{min}$-$Tg_{max}$ is preferably 5° C. or greater, and more preferably 10° C. or greater.

An upper limit of 100° C. for $Tc_{min}$-$Tg_{max}$ is practical. When the difference is in such a range, blow moldability tends to further improve.

Note that, before the preform is molded, the polyamide resin (B) and the polyester resin (C) used in the mixed resin layer are mixed to prepare the mixed resin in advance. Also, the mixing may be performed by dry blending or melt blending (melt-kneading). That is, each component may be dry blended to prepare the mixed resin, or each component may be melt blended to prepare the mixed resin. Of these methods, dry blending is preferable from the viewpoint of reducing the thermal history. Here, dry blending means mechanically mixing in a granular or pelletized form. Mixing is preferably implemented using a mixing device such as a tumbler mixer, a ribbon mixer, a Henschel mixer, or a Banbury mixer. Alternatively, when materials are to be supplied to the molding process, a predetermined amount of the polyester resin (C) is supplied by a feeder separate from the supply feeder for the polyamide resin (B) to form the mixed resin immediately prior to molding the parison.

Furthermore, when the polyamide resin (B) and the polyester resin (C) are to be melt kneaded, the temperature during melt kneading is not particularly limited, but from the viewpoint of sufficiently melting and thoroughly kneading the resins, the temperature is preferably from 300 to 255° C., more preferably from 290 to 260° C., and even more preferably from 285 to 265° C. In addition, the time for melt-kneading is not particularly limited, but from the viewpoint of uniformly mixing the resins, the melt-kneading time is preferably from 10 to 600 seconds, more preferably from 20 to 400 seconds, and even more preferably from 30 to 300 seconds. The device used for melt-kneading is not particularly limited, but examples include an open type mixing roll, a non-open type Banbury mixer, a kneader, and a continuous kneader (such as a single-screw kneader, a twin screw kneader, and a multi-screw kneader).

Furthermore, when other resins or other components are mixed in the polyester layer or the mixed resin layer, mixing is preferably implemented at the conditions for mixing the polyamide resin (B) and the polyester resin (C).

Next, the resin constituting the polyester layer is extruded from a first extruder, the resin constituting the mixed resin layer is extruded from a second extruder, and a parison (multilayered preform) is molded. More specifically, a step of molding the multilayered preform is preferably through an extrusion molding method, a co-injection molding method, or a compression molding method.

In extrusion molding, the resin constituting the polyester layer and the resin constituting the mixed resin layer are co-extrusion molded to form the multilayered preform.

Also, in co-injection molding, the resin constituting the polyester layer and the resin constituting the mixed resin layer are each extruded into a mold and co-injection molded to form a multilayered preform.

An example of a method for compression molding is a method in which the resin constituting the mixed resin layer is intermittently extruded in a heated and molten state into an extrusion channel in which the resin constituting the polyester layer flows in a heated and molten state, and the resin constituting the polyester layer and surrounding substantially all of the extruded resin constituting the mixed resin layer is extruded from an extrusion port of the extrusion channel and appropriately supplied as a molten resin molding material into a molding mold, and is subsequently compression molded to thereby mold a multilayered preform.

Of these methods, co-injection molding is preferable from the viewpoint of production efficiency.

In an embodiment the present invention, when the overall thickness is defined as 100%, it is preferable to produce a multilayered preform such that a location of the mixed resin layer starts at a position from 5 to 35% from the inner surface, and the thickness of the mixed resin layer is from 1 to 15% of the overall thickness. Specifically, by adjusting the injection amount from the injection cylinder unit described above, a multilayered container including a mixed resin layer at a desired position and of a desired thickness is obtained.

In the fabrication of a bottle in which the position of a barrier layer is modified in the thickness direction, the bottle can be produced by providing a valve system mechanism that is capable of adjusting the amount of each molten resin that is injected into the mold, with each molten resin corresponding to each layer, such as the polyester inner layer, the mixed resin layer, and the polyester outer layer. In addition, the position of the mixed resin layer in the thickness direction can also be adjusted as desired by adjusting the entrance angle of the flow channel of each layer at a junction section between the polyester layer and the mixed resin layer. Note that the method for adjusting the position of the mixed resin layer in the thickness direction is not limited to the method described above.

The method for producing the multilayered container according to an embodiment of the present invention is preferably a production method that includes the following steps 1 and 2 in this order.

1: Forming a multilayered container molded body having at least one polyester layer at an inner side relative the mixed resin layer and another at least one polyester layer at an outer side relative to a mixed resin layer.

2: Irradiating the multilayered container molded body with an electron beam.

In step 1 of the present production method, a multilayered container molded body is preferably formed by the method described above. Specifically, a multilayered container molded body is preferably obtained by injection blow molding, injection stretch blow molding, and direct blow molding, and is more preferably obtained by injection blow molding.

In step 2 of the production method, the multilayered container molded body is preferably irradiated with an electron beam from the inside.

Irradiating the multilayered container molded body from the inside with electron beams enables a sterilization treatment at a lower acceleration voltage, and thus is advantageous even in terms of energy conservation.

From the viewpoints of sterilizing the inner surface of the multilayered container, allowing the electron beams to reach the mixed resin layer, and thus improving oxygen absorption performance and delamination resistance, the acceleration voltage of the electron beams irradiated in step 2 is preferably 1 keV or greater, more preferably 5 keV or greater, and even more preferably 10 keV or greater. Furthermore, from the viewpoint of energy conservation, the acceleration voltage is preferably not greater than 200 keV, more preferably not greater than 150 keV, and even more preferably not greater than 130 keV.

In addition, from the viewpoints of sterilizing the inner surface of the multilayered container, allowing the electron beams to reach the mixed resin layer, and thus improving oxygen absorption performance and delamination resistance, the irradiation intensity (absorbed dose) of the electron beams irradiated in step 2 is preferably not less than 1 kGy, more preferably not less than 5 kGy, and even more preferably not less than 10 kGy, and from the viewpoint of energy conservation, the irradiation intensity is preferably 100 kGy or less, more preferably 75 kGy or less, and even more preferably 50 kGy or less.

The method and device for irradiating the multilayered container with electron beams from the inside are not particularly limited, and for examples thereof, JP 2018-072076 A and JP 2013-129453 A can be referenced.

EXAMPLES

The present invention will be described more specifically hereinafter using examples and comparative examples, but the present invention is not limited to these examples.

[Resins that are Used]

<Polyester Resin (A)>

PET (polyester resin): Polyethylene terephthalate (intrinsic viscosity: 0.83 dL/g), trade name: BK2180, available from Mitsubishi Chemical Corporation (melting point: 248° C.)

<Polyamide Resin (B)>

MXD6 (polyamide resin): poly(meta-xylylene adipamide) (relative viscosity: 2.7, melting point: 240±5° C.), trade name: MX Nylon 56007, available from Mitsubishi Gas Chemical Co., Inc.

<Polyester Resin (C)>

PET (polyester resin): Polyethylene terephthalate (intrinsic viscosity: 0.83 dL/g), trade name: BK2180, available from Mitsubishi Chemical Corporation (melting point: 248° C.)

[Measurement and Evaluation Methods]

<Thickness of Each Layer>

The thicknesses of each layer of the multilayered containers and multilayered films fabricated in the examples and comparative examples were measured as follows.

In the case of a multilayered container (multilayered bottle), at a position 70 mm from a bottom section of the bottle, samples measuring 1.5 cm×1.5 cm were cut out with a cutter in four directions (0°, 90°, 180°, 270°) with respect to the horizontal direction of the bottle. The overall thickness was measured using a Quick Micro MDQ micrometer available from Mitutoyo Corporation, and a ratio of the thicknesses of each layer was measured using a film thickness gauge (DC-8200, available from Gunze Co., Ltd.) in which light interference was used. The thickness of each layer was then calculated from the obtained overall thickness and the ratio of the thicknesses of each layer.

In the case of a multilayered film, four samples measuring 1.5 cm×1.5 cm were similarly cut out with a cutter, the overall thickness was measured using the Quick Micro MDQ micrometer available from Mitutoyo Corporation, and a ratio of the thicknesses of each layer was measured using a film thickness gauge (DC-8200, available from Gunze Co., Ltd.) in which light interference was used. The thickness of each layer was then calculated from the obtained overall thickness and the ratio of the thicknesses of each layer.

<Radical Concentration in Mixed Resin Layer>

The radical concentration in the mixed resin layer was determined as follows.

Only the mixed resin layer was removed from the films and containers fabricated in the examples and comparative examples. The mixed resin layer was cut out such that the sample mass was 15 mg, and was then used as a sample for measurements. Two types of standard samples were prepared by dissolving a standard substance (4-hydroxy-2,2,6,6-tetramethylpiperidine-1-oxyl free radical) in benzene at concentrations of $1.0 \times 10^{-5}$ mol/L and $1.0 \times 10^{-6}$ mol/L, and the electron spin resonance (ESR) of the measurement samples and the standard samples was measured (equipment used: JES-FR30 Free Radical Monitor, available from JEOL Ltd.). The radical concentration of the mixed resin layer was calculated from an intensity ratio of a radical peak of the standard substance and the radical peak of the sample. The measurement lower limit was set to $1.0 \times 10^{-12}$ mol/g.

<Evaluation of Adhesiveness>

A 1 cm×7 cm film was cut from each of the multilayered containers and multilayered films of the examples and comparative examples, and samples were prepared.

The ends of the mixed resin layer and the polyester layer of the side irradiated with electron beams were secured in a chuck attached to a tensile tester (STROGRAPH E2-L05, available from Toyo Seiki Seisaku-sho, Ltd.), and the maximum stress when subjected to a tensile test under the following conditions was used as the adhesive force (measurement conditions: peel angle of 180°, test speed of 50 mm/minute, distance between chucks of 50 mm, temperature of 23° C., and relative humidity of 50%).

An adhesive force of 2.7 N/cm or greater was indicated by A, an adhesive force from 2.2 N/cm to less than 2.7 N/cm was indicated by B, and an adhesive force of less than 2.2 N/cm was indicated by C. Higher adhesive force values indicate superior adhesiveness.

<Evaluation of Achromaticity>

The yellow index (YI) of the intermediate layer (mixed resin layer) was measured using a haze meter (COH400) available from Nippon Denshoku Industries Co., Ltd. Note that in a sample using a multilayered film, a YI value of less than 4.0 was indicated by A, a YI value of from 4.0 to less than 6.0 was indicated by B, and a YI value of 6.0 or higher was indicated by C. A smaller YI value indicates more superior achromaticity.

<Evaluation of Oxygen Barrier Property>

The oxygen barrier property was evaluated by the following method.

An oxygen permeability test was implemented through the MOCON method in accordance with ASTM D3985. The OX-TRAN 2/61 available from MOCON Inc. was used for the measurements. A 500 mL bottle produced in each of the Examples and Comparative Examples was filled with 100 mL of water, nitrogen at 1 atm was circulated inside the bottle at a rate of 20 mL/min under conditions including an oxygen partial pressure of 0.21 atm, a temperature of 23° C., a bottle internal humidity of 100% RH and an external humidity of 50% RH, and oxygen in the nitrogen after circulating inside the bottle was detected using a coulometric sensor, and thereby the oxygen permeability was measured.

The oxygen barrier property was determined from values for the oxygen permeation amount after 3 days from the startup of the measurements. A smaller value for the oxygen permeation amount indicates a more excellent oxygen barrier property.

The evaluation criteria were as follows.

A: 0.015 mL/(bottle·day·0.21 atm) or less

B: Greater than 0.015 mL/(bottle·day·0.21 atm) and less than or equal to 0.020 mL/(bottle·day·0.21 atm)

C: Greater than 0.020 mL/(bottle·day·0.21 atm)

Multilayered Container (Multilayered Bottle)

Comparative Example 1

Preparation of Resin Mixture

A resin mixture to be a mixed resin of the mixed resin layer after injection molding was prepared as follows.

Pellets of the polyamide resin (B) and pellets of the polyester resin (C) were placed in a polyethylene bag at a mass ratio of 80/20 and then dry blended so that the pellets were sufficiently mixed, and a resin mixture was obtained.

<Production of a Preform>

An injection molding machine having a valve system capable of adjusting the amount of each resin injected into the mold, and a multilayered hot runner mold were used to produce a preform having a three-layer structure of a polyester layer/mixed resin layer/polyester layer under the conditions indicated below.

The injection amounts were adjusted and injection was implemented such that the injection amount of the polyester resin (A) forming the inner polyester layer was 14.29% of the total, the injection amount of the mixed resin (resin mixture) of the polyamide resin (B) and the polyester resin (C) forming the intermediate mixed resin layer was as 5.71% of the total, and the injection amount of the polyester resin (A) forming the outer polyester layer was 80.00% of the total, and the cavity of the mold was filled to obtain a preform (25 g) having a three-layer structure of the polyester layer/mixed resin layer/polyester layer. The shape of the preform included an overall length of 92 mm, an outer diameter of 22 mm, and a wall thickness of 3.9 mm.

Skin-side injection cylinder temperature: 285° C.
Core-side injection cylinder temperature: 265° C.
Resin flow channel temperature in mold: 290° C.
Mold cooling water temperature: 15° C.

<Production of Multilayered Bottle>

Multilayered bottles were produced by biaxially stretching and blow molding the obtained preforms using a biaxial stretch blow molding apparatus (model EFB1000ET, available from Frontier Inc.). The overall length of each bottle was 223 mm, the outer diameter was 65 mm, and the internal volume was 500 mL (surface area: 0.04 m$^2$, trunk section average thickness: 0.35 mm), and the bottom part was petaloid shaped. No dimples were provided in the trunk section. The biaxial stretch blow molding conditions were as indicated below. Note that the vicinity of the neck section and the bottom section of the produced multilayered bottles were formed only from a polyester layer.

Preform heating temperature: 110° C.
Primary blow pressure: 0.9 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Mold temperature: 30° C.

Example 1

<Electron Beam Irradiation>

A multilayered bottle produced by the method of Comparative Example 1 was irradiated with an electron beam from the inside of the bottle such that the absorption dose was 30 kGy at an acceleration voltage of 100 keV, and a multilayered bottle having a radical concentration of $6.5 \times 10^{-9}$ mol/g in the mixed resin layer was produced.

Comparative Example 2

A bottle was molded in the same manner as in Comparative Example 1 with the exception that MXD6 (polyamide resin) was used in place of the mixed resin of Comparative Example 1.

Comparative Example 3

A multilayered bottle produced by the method of Comparative Example 2 was irradiated with an electron beam in the same manner as in Example 1, and a multilayered bottle having a radical concentration of $2.4 \times 10^{-6}$ mol/g in the mixed resin layer was obtained.

Comparative Example 4

A single layer preform in which only the polyester resin (A) was used was produced, and the single layer preform was then biaxially stretched and blow molded in the same manner as Example 1 to produce a multilayered bottle, which was then irradiated with electron beams, and a single layer bottle was obtained.

The multilayered bottles produced in Example 1 and Comparative Examples 1 to 4 were subjected to the measurements and evaluations described above. The results are shown in Table 1.

TABLE 1

|  |  | Example 1 | Comparative Example 1 | Comparative Example 2 | Comparative Example 3 | Comparative Example 4 |
|---|---|---|---|---|---|---|
| Inner layer | Composition | PET | PET | PET | PET | PET |
|  | Thickness (μm) | 50 | 50 | 50 | 50 | 350 |
| Intermediate layer | Composition | MXD6/PET | MXD6/PET | MXD6 | MXD6 |  |
|  | (mass ratio) | 80/20 | 80/20 | 100 | 100 |  |
|  | Thickness (μm) | 20 | 20 | 20 | 20 |  |
|  | Radical concentration ($\times 10^{-12}$ mol/g) | 6500 | Measurement lower limit or less | Measurement lower limit or less | 2400000 |  |
| Outer Layer | Composition | PET | PET | PET | PET |  |
|  | Thickness (μm) | 280 | 280 | 280 | 280 |  |
| Electron beam irradiation | Irradiation intensity (absorption dose: kGy) | 30 | No irradiation | No irradiation | 30 | 30 |
| Adhesiveness | Adhesiveness Test (N/cm) | 3.8 | 1.5 | 0.7 | 2.1 | — |
|  | Evaluation | A | C | C | C | — |
| Achromaticity | YI Value | 3.1 | 2.8 | 1.5 | 6.4 | 0.9 |
|  | Evaluation | A | A | A | C | A |

TABLE 1-continued

|  |  | Example 1 | Comparative Example 1 | Comparative Example 2 | Comparative Example 3 | Comparative Example 4 |
|---|---|---|---|---|---|---|
| Oxygen Barrier Property | Oxygen Permeation Amount (mL/(bottle · day · 0.21 atm)) | 0.0095 | 0.0095 | 0.0085 | 0.0085 | 0.03 |
|  | Evaluation | A | A | A | A | C |

Multilayered Film

Examples 2 to 9 and Comparative Examples 5 to 9

Production of Multilayered Film

A polyester resin for forming a first outer layer and a second outer layer and a resin mixture for forming an intermediate layer were molded using a multilayered film molding machine equipped with two extruders and a flow path for forming a multilayered structure having three layers of two types, and multilayered films made from three layers of two types were formed with each layer being as described in Table 2 and Table 3.

Note that the extrusion temperature of the extruders was set to 260° C. for the resin forming both outer layers and was set to 260° C. for the resin forming the intermediate layer, the temperature of the flow path after lamination was set to 280° C., and the flow rate was adjusted such that each layer was formed with the thickness shown in Tables 2 and 3.

<Electron Beam Irradiation>

The films obtained by the method described above were irradiated with electron beams from the first outer layer side such that the absorption dosages at an acceleration voltage of 100 keV became the values described in Table 2 and Table 3.

TABLE 2

|  |  | Example 2 | Example 3 | Example 4 | Example 5 | Example 6 | Example 7 | Example 8 | Example 9 |
|---|---|---|---|---|---|---|---|---|---|
| First outer layer | Composition | PET | PET | PET | PET | PET | PET | PET | PET |
|  | Thickness (μm) | 50 | 50 | 50 | 50 | 30 | 60 | 50 | 50 |
| Intermediate layer | Composition (mass ratio) | MXD6/PET 80/20 | MXD6/PET 80/20 | MXD6/PET 80/20 | MXD6/PET 90/10 | MXD6/PET 90/10 | MXD6/PET 90/10 | MXD6/PET 90/10 | MXD6/PET 60/40 |
|  | Thickness (μm) | 20 | 20 | 20 | 20 | 20 | 20 | 20 | 20 |
|  | Radical concentration ($\times 10^{-12}$ mol/g) | 6800 | 110 | 105000 | 87000 | 91000 | 7300 | 115000 | 4600 |
| Second outer layer | Composition | PET | PET | PET | PET | PET | PET | PET | PET |
|  | Thickness (μm) | 130 | 130 | 130 | 130 | 130 | 130 | 130 | 130 |
| Electron beam irradiation | Irradiation intensity (Absorption dose: kGy) | 30 | 10 | 50 | 30 | 30 | 30 | 50 | 50 |
| Adhesiveness | Adhesiveness Test (N/cm) | 2.8 | 2.4 | 3.0 | 2.6 | 2.7 | 2.6 | 2.8 | 3.3 |
|  | Evaluation | A | B | A | B | A | B | A | A |
| Achromaticity | YI Value | 3.6 | 3.2 | 4.1 | 3.9 | 4.2 | 3.7 | 4.6 | 4.3 |
|  | Evaluation | A | A | B | A | B | A | B | B |

TABLE 3

|  |  | Comparative Example 5 | Comparative Example 6 | Comparative Example 7 | Comparative Example 8 | Comparative Example 9 |
|---|---|---|---|---|---|---|
| First outer layer | Composition | PET | PET | PET | PET | PET |
|  | Thickness (μm) | 50 | 50 | 50 | 50 | 50 |
| Intermediate layer | Composition (mass ratio) | MXD6/PET 80/20 | MXD6/PET 90/10 | MXD6/PET 60/40 | MXD6 100 | MXD6 100 |
|  | Thickness (μm) | 20 | 20 | 20 | 20 | 20 |
|  | Radical concentration ($\times 10^{-12}$ mol/g) | Measurement lower limit or less | Measurement lower limit or less | Measurement lower limit or less | Measurement lower limit or less | 2800000 |
| Second outer layer | Composition | PET | PET | PET | PET | PET |
|  | Thickness (μm) | 130 | 130 | 130 | 130 | 130 |
| Electron beam irradiation | Irradiation intensity (Absorption dose: kGy) | No irradiation | No irradiation | No irradiation | No irradiation | 30 |

TABLE 3-continued

|  |  | Comparative Example 5 | Comparative Example 6 | Comparative Example 7 | Comparative Example 8 | Comparative Example 9 |
|---|---|---|---|---|---|---|
| Adhesiveness | Evaluation | C | C | C | C | C |
|  | Adhesiveness Test (N/cm) | 1.1 | 0.9 | 2.1 | 0.36 | 1.9 |
| Achromaticity | Evaluation | A | A | A | A | C |
|  | YI Value | 2.9 | 2.1 | 3.5 | 1.2 | 6.1 |

From the results of Tables 1 to 3, it is clear that the examples satisfying the requirements of the present invention excelled in gas barrier properties and achieved an even higher level of adhesiveness and achromaticity in a compatible manner.

According to the present invention, a resin laminate, a multilayered film, and a multilayered container can be obtained with excellent gas barrier properties as well as excellent adhesiveness between layers and excellent achromaticity. Therefore, the present invention can be suitably used as a packaging film for food products that are easily affected by oxygen, the packaging film thereof requiring recyclability, and as a container for containing food products and beverages that are susceptible to external impact during transport or use, and that require a confirmation of the color or the like of the contents from the outside, such as, for example, oils, seasonings, carbonated beverages, alcoholic beverages, coffees, fruit juice, and teas.

REFERENCE SIGNS LIST

1 Preform
2 Infrared heater
3 Mold
4 Stretching rod
5 Multilayered container

The invention claimed is:

1. A resin laminate comprising:
a polyester layer containing a polyester resin (A); and
a mixed resin layer containing a polyamide resin (B) and a polyester resin (C);
wherein the polyamide resin (B) includes a constituent unit derived from a diamine and a constituent unit derived from a dicarboxylic acid, 70 mol % or greater of the constituent unit derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons; and
a radical concentration in the mixed resin layer is $1 \times 10^{-12}$ mol/g or greater.

2. The resin laminate according to claim 1, wherein a mass ratio [(B)/(C)] of the polyamide resin (B) to the polyester resin (C) in the mixed resin layer is from 55/45 to 99/1.

3. The resin laminate according to claim 1, wherein the polyester resin (A) includes a constituent unit derived from a dicarboxylic acid and a constituent unit derived from a diol, 90 mol % or greater of the constituent unit derived from a dicarboxylic acid being a constituent unit derived from terephthalic acid, and 90 mol % or greater of the constituent unit derived from a diol being a constituent unit derived from ethylene glycol.

4. The resin laminate according to claim 1, wherein the polyester resin (C) includes a constituent unit derived from a dicarboxylic acid and a constituent unit derived from a diol, 90 mol % or greater of the constituent unit derived from a dicarboxylic acid being a constituent unit derived from terephthalic acid, and 90 mol % or greater of the constituent unit derived from a diol being a constituent unit derived from ethylene glycol.

5. The resin laminate according to claim 1, wherein the polyamide resin (B) includes a constituent unit derived from a diamine and a constituent unit derived from a dicarboxylic acid, 80 mol % or greater of the constituent unit derived from a diamine being a constituent unit derived from xylylenediamine, and 80 mol % or greater of the constituent unit derived from a dicarboxylic acid being a constituent unit derived from adipic acid.

6. The resin laminate according to claim 1, wherein the resin laminate is a three-layer structure laminated in the order of polyester layer/mixed resin layer/polyester layer, or a five-layer structure laminated in the order of polyester layer/mixed resin layer/polyester layer/mixed resin layer/polyester layer.

7. The resin laminate according to claim 1, wherein the resin laminate is irradiated with an electron beam.

8. The resin laminate according to claim 1, wherein the radical concentration in the mixed resin layer is from $10 \times 10^{-12}$ to $2000000 \times 10^{-12}$ mol/g.

9. A multilayered film comprising the resin laminate described in claim 1.

10. A multilayered container comprising the resin laminate described in claim 1.

11. The multilayered container according to claim 10, comprising at least one polyester layer at an inner side relative to the mixed resin layer and another at least one polyester layer at an outer side relative to the mixed resin layer.

12. The multilayered container according to claim 10, wherein an overall thickness of the multilayered container is from 50 to 500 µm.

13. The multilayered container according to claim 10, wherein when the overall thickness is defined as 100%, a location of the mixed resin layer starts at a position from 5 to 35% from an inner surface, and a thickness of the mixed resin layer is from 1 to 15%.

14. A method for producing a multilayered container satisfying (1) to (3), the method comprising steps 1 and 2:
1: forming a multilayered container molded body including at least one polyester layer at an inner side relative to a mixed resin layer and another at least one polyester layer at an outer side relative to a mixed resin layer; and
2: irradiating the multilayered container molded body with an electron beam; wherein
(1) the multilayered container includes a polyester layer containing a polyester resin (A), and a mixed resin layer containing a polyamide resin (B) and a polyester resin (C), and
(2) the polyamide resin (B) includes a constituent unit derived from a diamine and a constituent unit derived from a dicarboxylic acid, 70 mol % or greater of the constituent derived from a diamine being a constituent unit derived from xylylenediamine, and 70 mol % or greater of the constituent unit derived from a dicarboxylic acid being a constituent unit derived from an α,ω-linear aliphatic dicarboxylic acid having from 4 to 20 carbons, and (3) a radical concentration in the mixed resin layer is $1\times10^{-12}$ mol/g or greater.

15. The method for producing a multilayered container according to claim 14, wherein, in the step 2, the multilayered container molded body is irradiated with an electron beam from the inside.

\* \* \* \* \*